United States Patent
Giltsoff

[11] Patent Number: 5,948,848
[45] Date of Patent: Sep. 7, 1999

[54] BIODEGRADABLE PLASTIC MATERIAL AND A METHOD FOR ITS MANUFACTURE

[75] Inventor: Bayan Oleg Thadius Giltsoff, Stepaside, Ireland

[73] Assignee: Solplax Limited, Galway, Ireland

[21] Appl. No.: 09/029,622

[22] PCT Filed: Sep. 6, 1996

[86] PCT No.: PCT/IE96/00060

§ 371 Date: Mar. 6, 1998

§ 102(e) Date: Mar. 6, 1998

[87] PCT Pub. No.: WO97/09379

PCT Pub. Date: Mar. 13, 1997

[30] Foreign Application Priority Data

Sep. 8, 1995 [IE] Ireland .................................. S950699

[51] Int. Cl.⁶ .................................................. C08K 5/20
[52] U.S. Cl. .......................... 524/503; 524/227; 524/386; 524/389; 524/399
[58] Field of Search ................................ 524/503, 227, 524/803, 557, 459, 386, 389, 399; 523/124; 525/330.6; 604/378, 904, 368, 364, 372

[56] References Cited

U.S. PATENT DOCUMENTS

| | | |
|---|---|---|
| 2,948,697 | 8/1960 | Robertson . |
| 3,066,999 | 12/1962 | Nakajo et al. ............................ 18/54 |
| 3,287,313 | 11/1966 | Imoto ................................... 524/230 |
| 3,397,162 | 8/1968 | Takigawa et al. ..................... 524/230 |
| 3,769,151 | 10/1973 | Knutson et al. ....................... 524/388 |
| 3,886,112 | 5/1975 | Watson et al. . |
| 3,997,489 | 12/1976 | Coker . |
| 4,323,492 | 4/1982 | Zimmerman et al. .................. 524/503 |
| 4,469,837 | 9/1984 | Cattaneo ................................ 524/388 |
| 4,529,666 | 7/1985 | Salzburg et al. . |
| 4,536,532 | 8/1985 | Miller et al. ............................ 524/230 |
| 4,542,178 | 9/1985 | Zimmerman et al. .................. 524/388 |
| 4,656,216 | 4/1987 | Muller et al. . |
| 4,753,760 | 6/1988 | Kawaguchi et al. ................... 524/230 |
| 5,102,950 | 4/1992 | Terada et al. ............................ 525/60 |
| 5,110,859 | 5/1992 | Flesher et al. . |
| 5,206,278 | 4/1993 | Famili et al. . |
| 5,322,866 | 6/1994 | Mayer et al. ........................... 524/394 |
| 5,349,000 | 9/1994 | Robeson et al. . |
| 5,462,981 | 10/1995 | Bastioli et al. ........................ 524/503 |
| 5,489,638 | 2/1996 | Burdick . |
| 5,583,187 | 12/1996 | Sharak et al. . |

FOREIGN PATENT DOCUMENTS

| | | |
|---|---|---|
| 0004587 | 10/1979 | European Pat. Off. . |
| 0155606 | 9/1985 | European Pat. Off. . |
| 0635545 | 1/1995 | European Pat. Off. . |
| WO A-9309171 | 5/1993 | WIPO . |
| WO A-9201556 | 1/1995 | WIPO . |

OTHER PUBLICATIONS

Hoechst Resins Special Print, "Plastic Films Formed From Polyvinyl Alcohol", by Dr. Albrecht Harreus, et al., Company brochure Hoechst AG 1991.

*Primary Examiner*—Veronica P. Hoke
*Attorney, Agent, or Firm*—Mathews, Collins, Shepherd & Gould, P.A.

[57] ABSTRACT

A process of preparing biodegradable plastics material comprising 1) mixing a stabilizer such as an amide or metal salt with a partially hydrolyzed, water-soluble polyvinyl alcohol (PVA) copolymer, 2) adding a plasticizer to the mixture, 3) mixing said materials in the temperature range of between 106 and 140 C. and 4) compounding the blend by known processes.

14 Claims, 1 Drawing Sheet

BIODEGRADABLE PLASTIC MATERIAL AND A METHOD FOR ITS MANUFACTURE

The present invention relates to a biodegradable plastics material and to a method for its manufacture. In particular, the invention relates to a biodegradable plastics material comprising a polyvinylacetate/polyvinylalcohol copolymer.

Commercially available biodegradable plastics do not fully degrade in the environment and retain a high degree of toxicity when partially degraded. Furthermore, such materials are expansive and generally only used for niche markets.

The use of polyvinylacetate/polyvinylalcohol (PVA) copolymers for the manufacture of biodegradable plastics materials is described in WO92/01556. By layering or surrounding PVA which is water soluble at 20° C. with a thin layer of a PVA which is water insoluble at 20° C., an article which is protected from dissolution by water until its waterproofing, insoluble layer is breached may be manufactured. The PVA's are co-extruded as a laminate or may be moulded, with or without an intervening filler layer. Water soluble PVA dissolves readily in water and is broken down in the environment within a relatively short time to carbon dioxide and water.

The Hoescht AG Resins specialty print (1991), "Plastic Films Formed From Polyvinyl Alcohol" by Albrecht Harricus et al, discloses that in order to process PVA plastics material on standard processing apparatus such as profile extruding machines, blown film extruders or injection moulding machines, undesirable thermal decomposition of the products occurs at temperatures above 150° C. and must be prevented by external plasticising of granular plastics material. The plastics material is plasticized by mixing with a suitable plasticizer for 15–30 mins. at a temperature of up to 110° C. This plasticized PVA can be injection moulded and extruded under the following conditions: heating the material to a temperature in the range 145–190° C. and at an injection pressure of 100–130 bar.

While PVA is known as a biodegradable material, its use in the manufacture of plastic articles has up to now been limited as it is technically difficult to work with this material and to produce an acceptable product, therefore it is costly and commercially unsuccessful.

The present invention seeks to provide an improved plastics material comprising a PVA copolymer which can readily be worked by known processes such as blow moulding, injection moulding, cast extrusion, etc. and which is suitable for the manufacture of biodegradable articles.

The term PVA as used herein refers to a polyvinylacetate polymer which has been partially hydrolysed to convert a proportion of the acetate groups to the corresponding alcohol. Therefore, the term refers to a polyvinylacetate/polyvinylalcohol copolymer. The solubility of the PVA is dependent, inter alia, on the degree to which the PVA is hydrolysed. "Cold soluble" PVA denotes a copolymer which is generally referred to as "partially hydrolyzed" polyvinylacetate. Typically, the partially hydrolyzed copolymer comprises 70 to 85 wt % of the alcohol, with the remainder comprising residual acetate, and this material is soluble in "cold" water. It is generally readily soluble in water at 20° C. Further hydrolysis of the PVA to levels at which the alcohol comprises about 96 mol % or greater (usually referred to as "fully hydrolyzed" polyvinylalcohol, results in a marked decrease in solubility. While the fully hydrolyzed polymer is usually thought of as insoluble, it is in fact soluble in water at a temperature of about 50° C. or greater. Such material is referred to herein as "hot soluble" PVA.

Both hot and cold soluble PVA's, once dissolved, are fully biodegradable in nature to $CO_2$ and $H_2O$. The undegraded copolymers and their partially degraded derivatives are non-toxic.

The present invention provides a method of manufacturing a biodegradable plastics material comprising mixing partially hydrolysed, water soluble polyvinyl alcohol (PVA) co-polymer with a plasticizer and stabiliser at a temperature in the range of between 106 to 140° C., whereby the resultant material can readily be worked by known processes and is suitable for the manufacture of water soluble and biodegradable articles.

The method may comprise the following steps:

a. mixing the stabiliser with the PVA; and b. adding the plasticiser to the mixture of stabiliser and PVA and mixing at a temperature between 106 to 140° C.

After the mixing stage, the method may include the steps of compounding and pelletising the resultant product to produce a useable, commercial pellet wherein the compounding is carried out at a temperature in the range 195–225° C.

The method may include processing the plastics material further by blow moulding, cast extrusion, injection moulding or any other suitable type of process currently in use.

The mixing stage may include mixing PVA and stabiliser are mixed in a forced action blender.

The stabiliser may be included in an amount in the range of 4 to 6% w/w (weight of stearamide to weight of PVA) and the plasticiser is included in an amount in the range of 3 to 15% w/w (weight of plasticiser to weight of PVA).

The stabiliser may stearamide or a stearate and the plasticiser may comprise glycerol or glycerine solution or soya bean oil.

The mixing stage may be carried out at a temperature in the range of 123 to 129° C.

The method may include the step of applying a waterproofing agent to at least a portion of the surface of the plastics material so that at least a portion of the material is rendered resistant to water to prevent premature dissolution of the product on contact with water.

The waterproofing agent may be phenoxy resin.

The invention also provides a fully or substantially fully biodegradable article produced by the method of the invention.

According to the invention, the addition of a stabiliser to the PVA feedstock during compounding of the plastics material results in a product which can readily be worked into a product by any of the commonly used methods. The PVA feedstock may be cold or hot soluble, partially hydrolysed PVA which is 70–85 wt % polyvinyl alcohol. A broad range of polymer molecular weights are suitable for use, depending on the desired characteristics of the final product. Generally, molecular weights in the range of 20,000 d to 90,000 d are usable. Plastics made from PVA's falling into the lower part of this range will be softer and pliable, and will be suitable for making relatively flimsy films. Selection of PVA's from the upper end of the range will allow much harder plastics to be made, for example for making articles such as bottles, moulds, bowls, etc. The preferred molecular weight range is from about 50,000 d to about 60,000 d, degree of hydrolysis 76.7–79.3 mol %. PVA's in this range, when compounded as described herein, may readily be extruded to give good quality product.

The most preferred stabiliser for use in the manufacture of the plastics material is stearamide (octadecanamide), which is a fully biodegradable substance. Alternatively stearates such as zinc stearate can also be used. Stearamide is added in the range of between about 4 to 6 wt %, with 5 wt % being preferred.

A plasticiser is also added and preferably this will also be a biodegradable substance. Typically, the plasticiser will be glycerol or glycerine and will be present in the range of between about 3 to 15 wt %, preferably 5 to 10 wt % and optimally about 5 wt %. The stearamide and glycerol in combination provide and excellent stabilising/plasticising effect in the plastics material. The rigidity of the plastics product can be controlled by varying the amount of glycerol and stearamide added, the product becoming softer and more pliable as the weight % of stearamide and/or glycerol is increased.

Other additives, well known in the art, may also be used in compounding the plastics material according to the invention. Such additives may include colouring compounds and fillers.

The plastics material may be compounded by any suitable means known in the art. Most preferably, the PVA feedstock in the form of powder or granules is mixed with the stearamide, glycerol and optional other ingredients in a forced action blender. However achieved, the mixing will be done at an elevated temperature of between 106 to 140° C., preferably between 123° C. and 129° C. when film will be blown subsequently, and optimally about 125° C. After mixing, the plastics material may be pelleted or otherwise prepared, ready for forming into a desired article by extrusion, moulding or otherwise.

The article prepared in this way will be fully or almost fully biodegradable. When it is to be discarded to waste, it need only be brought into contact with water, either cold or hot, depending on the PVA feedstock chosen, to cause it to dissolve. The dissolved PVA will then be fully biodegradable within about 28 days to $CO_2$ and $H_2O$. Likewise, the biodegradable additives in the plastics material will degrade. The PVA in itself is non-toxic and therefore poses no environmental hazard during the time during which it is being biodegraded.

Clearly, the plastics material described above is suitable only for the manufacture of articles which do not, or are unlikely to, come into contact with water during their normal usable life. According to another aspect of the invention, a PVA plastics articles which is at least partially waterproof, water resistant or hydrophobic is provided. Water resistance will be required in any article which during its normal storage or use, is in contact with an aqueous environment or a humid environment. Those surfaces of the article which are exposed to the aqueous or humid environment need to be protected from that environment until such time as the article is to be discarded to waste. Examples of such articles include, without limitation, plastic bags, sachets, sacks, wrappers, packaging and the like, films, containers including bottles, jars, beakers, pots and the like and liners including sanitary products such as napkins, nappy liners and the like. Many other applications will suggest themselves to the skilled person. In some cases, all surfaces of the article will require to be rendered waterproof while in other cases, only a portion of the article need be so treated. However waterproofed, the article will easily be disposed of after use. In the case where only a portion of the article has been made water resistant, contacting the untreated portion of the article with water will cause the article as a whole to dissolve. Where all exposed surfaces of the article have been waterproofed, then for disposal, the article need only be broken to expose its interior to the aqueous solvent and thereafter, dissolution of the entire article will occur.

The waterproofing may be achieved in any suitable way or combination of ways, as will now be described.

(1) Polymer Crosslinking.

A thin layer of the surface of the article may be made water resistant by crosslinking the copolymer. One way of achieving this is to add an ultra-violet sensitiser to the PVA during compounding, for example sodium benzoate, benzamide, benzoic acid or tetrazolium salts. After forming an article from the plastics material, the article is subjected to ultra-violet irradiation, during which the sensitiser promotes crosslinking of the polymer chains at the irradiated surface, rendering the crosslinked polymers insoluble, with the effect that a thin layer of the PVA at the surface of the article becomes water resistant. Optionally, a migrating agent may be added to assist the movement of the sensitiser to the surface. Alternatively, the sensitiser may be applied to the surface of the article after manufacture and prior to irradiation.

(2) Silanisation.

The article or a surface thereof may be coated with silane. The silane may be in liquid or gaseous form. The article may be bathed in a silane, or the silane may be applied to the article by dipping, spraying or painting. This is valid for light water resistance.

(3) Treatment With Other Waterproofing Compound.

A waterproofing compound may be added to the PVA feedstock during compounding of the plastics material. This compound may be a hydrophobic substance. A migrating agent may be added to assist movement of the waterproofing compound to the surface of the article formed from the plastics material. The waterproofing agent may itself be a migrating agent. As an alternative to compounding the waterproofing agent into the plastics, it may be applied to the finished article by dipping, spraying or painting. One suitable waterproofing agent is phenoxy resin. Polyvinylacetate or other suitable, non-toxic polymer may be used as a surface coat on the PVA article. To assist adhesion of the waterproofing agent to the surface of the article, it may be treated for example by electrical treatment prior to coating to condition the surface so as to render it more able to accept and retain the waterproofing coating.

In some cases, it will be appropriate to manufacture the article from hot soluble PVA. Provided that the article does not encounter water at a temperature in excess of about 45° C. during its normal use, such a product need not be surface water-proofed. After use, placing the object in water heated to at least 50° C. will promote its dissolution for disposal. An article prepared in this way will be fully or almost fully biodegradable.

The invention will now be described more particularly with reference to the following non-restrictive examples and to FIG. 1 of the drawings in which is shown an embodiment of the screw design used in the apparatus at the compounding stage of the process of the present invention.

EXAMPLE 1

Mixing Stage

A Prism lab 6 high speed mixer was used (Henschel 50 kg mixer also used).

Ingredients 5 kg PVA (degree of hydrolysis of 76.7 to 79.3 mol %)

0.25 kg stearamide (5% w/w of stearamide to weight of PVA)

0.25 kg of glycerol (5% w/w of glycerol to weight of PVA)

A high speed forced action blender was used. The PVA and stearamide were added to the mixer and mixed for 1 minute. The glycerol was added slowly over a period of 30 seconds, with the mixer rotating at approximately 500 rpm. As a result of the agitation, the mix became frothy ("fluffed up") and the mixer was stopped to push mixed material from the inside of the mixer. After 2–5 minutes, the mix had settled down and the mixer was turned up to full speed, from 1,500 rpm to 3,000 rpm. As a result of the kinetic energy generated by the agitation of the mix, the temperature increased to 123° and went to 125° in 8 to 20 minutes depending on the type of mixer used.

The temperature is a critical parameter to achieving high quality product.

A vacuum was created at the top of the mixer to draw off any moisture vapour which had formed at the top of the mixer and which would otherwise condense back into the mix.

The mix was allowed to cool to 60–70° C. so that it was sufficiently cool to allow it to be bagged. The mix can be allowed to cool by itself or optionally a heating/cooling jacket can be included on the mixer vessel.

Alternatively mix can be transferred to another vessel to cool. The mixture was stirred occasionally to help cooling and break up any lumps which had formed. The product is in granular form and is bagged in air-tight bags.

Compounding/Pelleting Stage

A Prism TSE 16TC twin screw extruder with 4½ mm die was used for the compounding stage.

The temperature range was 200° C.–218° C. measured from the feed end of the screw to the die end.

The extruder is vented along the screw to allow moisture vapour to exit the screw because otherwise bubbles occur in the strands. The product emerges from the extruder in the form of a strand which has elastic properties. The strands must be dried in air using air knives, for instance, and not in water. After cooling, the strands were cut into pellets using a Prism LPT 16 laboratory pelletiser. The pellets were then bagged in an air tight fashion.

BRIEF DESCRIPTION OF DRAWING

The screw design of the twin screw extruder is shown in FIG. 1. A single screw apparatus could also be used for compounding.

Figure 1:
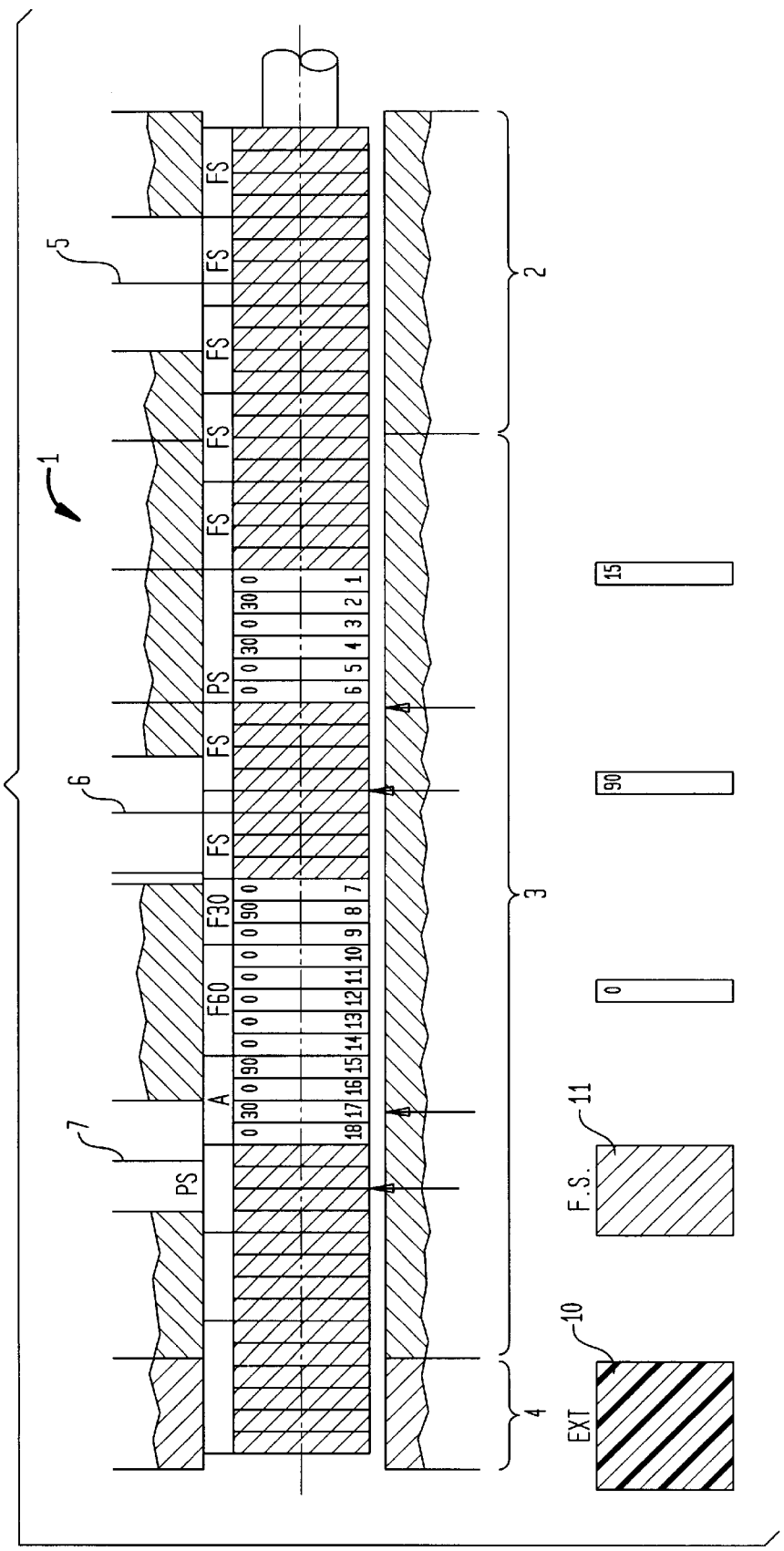
Referring to FIG. 1, the screw is indicated generally by reference numeral 1 and includes three zones, namely a feed zone 2, a work zone 3 and a die zone 4.

The feed enters the screw through a feed port 5. Two other ports 6, 7 are included along the length of the screw, to allow for addition of material if required, (6) and for venting (7) respectively. A heating band and a temperature probe respectively are included at two locations along the length of the screw.

The configuration of the screw includes several elements namely an extrusion screw indicated by the letters EXT (length=1.5 times the diameter) and feedscrew elements indicated by the letters FS (length equal to its diameter). The screw also includes mixing elements (length=diameter divided by 4) which may be 0° offset, 90° offset or 15° offset. The mixing elements may be forwarding (F), reversing (R) or alternating (A).

Blowing Film

A Betol 0250 film tower machine was used.

The temperature profile along the screw extruder is as follows:

| Feed zone of barrel | 195–210° C. |
|---|---|
| Work zone of barrel | 200–218° C. |
| Die zone | 200–218° C. |

Screens of 200/inch$^2$ gauge size are used to soften the memory of the PVA and reduce the risk of any possible extraneous matter and gels. Further screens are also provided of 40/inch$^2$, 60/inch$^2$, 80/inch$^2$, 100/inch$^2$ and 120/inch$^2$ secured to the 200/inch$^2$ screen to give it strength.

Screens are located between the end of the screw and the die.

Spraying the Waterproofing Agent, Phenoxy Resin, Onto the Film

Mixing (Before Spraying)

100 g phenoxy resin was mixed with 500 mls Methyl Ethyl Ketone (MEK) initially to 20% w/w solids. This is mixed in a high speed mixer or is left to stand at a temperature of a minimum of 28° C. for 3–5 days with periodic shaking to achieve a solution. When the phenoxy resin was in solution, a mixture comprising 500 mls of MEK and 12 mls water was added to the solution. Thus the phenoxy resin was then in solution at a concentration of approximately 10% w/w.

A 10% w/w solution of phenoxy resin was used for spraying a film of thickness 40 μm. Alternatively 5% or 2.5% solution of phenoxy in MEK with water added was also be used depending on the thickness of the film to be sprayed. Lower concentrations of phenoxy resin in MEK with water may also be used.

Spraying

Spraying was carried out in dry conditions and preferably at a minimum temperature of 21° C. A Campbell Hausfeld Professional Turbo Spray (high volume/low pressure finishing system HV2,000) was used for spraying but conventional sprayers may also be used. The humidity of the atmosphere in which spraying is being conducted is a critical parameter. The film was sprayed so as to achieve good cover but without overspraying. Thin film below 40 μm needs stretching so that no folds occur during spraying and must be held flat. Heavier plastics must also be held flat. Alternatively, heavier plastics (60 μm+) can be dipped or use sponge or roller to apply.

EXAMPLE 2

Mixing Stage

Ingredients 5 kg PVA (degree of Hydrolysis of 76.7 to 79.3 mol %)
0.5 kg glycerol (10% w/w) glycerol
0.25 kg (5% w/w) stearamide The procedure is the same as in the mixing state described in Example 1.

Compounding/Pelletising Stage

The temperature profile along the screw extruder was as follows:

| Feed zone of barrel | 200° C. |
|---|---|
| Work zone of barrel | 205° C. |
| Die zone | 210° C. |
| Rpm 260 | |
| Output 2.5 kg/hr approximately | |

EXAMPLE 3

Mixing Stage 5 kgs PVA
0.75 kg glycerol (15% w/w) glycerol
0.25 kg (5% w/w) stearamide Compounding/Pelletising Stage

| | |
|---|---|
| Feed zone of barrel | 200° C. |
| Work zone of barrel | 215° C. |
| Die zone | 216° C. |
| Rpm 260° | |
| Output 2.5 kg/hr approximately. | |

Further Examples of Parameters at the Compounding and Blowing Stages

A Prism TSE 16TC apparatus was used for compounding with a blow line attachment for blowing film.

The temperature of the various zones is given in °C. in the following examples.

EXAMPLE 4

| Film Blowing Zone | Die Zone | Work Zone | Feed Zone |
|---|---|---|---|
| 215 | 209 | 207 | 200 |

Good quality film was produced.

EXAMPLE 5

| Film Blowing Zone | Die Zone | Work Zone | Feed Zone |
|---|---|---|---|
| 215 | 209 | 209 | 197 |

| | |
|---|---|
| Pressure | 40–45 bar (4000–4500 kN/M$^2$) (pressure at exit end of screw) |
| Feed | 0.5 |
| rpm | 303 |

EXAMPLE 6

| Film Blowing Zone | Die Zone | Work Zone | Feed Zone |
|---|---|---|---|
| 215 | 212 | 209 | 199 |

| | |
|---|---|
| Pressure | 40–45 bar (4000–4500 kN/M$^2$) |
| Torque | 7.8–8.0 NM |
| Rpm | 301 |

EXAMPLE 7

| Film Blowing Zone | Die Zone | Work Zone | Feed Zone |
|---|---|---|---|
| 195 | 202 | 191 | 183 |

| | |
|---|---|
| Pressure | 60 bar (6000 kN/M$^2$) |
| Torque | 8.0–8.4 NM |

These parameters resulted in poor quality film.

EXAMPLE 8

| Film Blowing Zone | Die Zone | Work Zone | Feed Zone |
|---|---|---|---|
| 188 | 201 | 188 | 182 |

| | |
|---|---|
| Pressure | 75 bar (7500 kN/M$^2$) |
| Torque | 8.6 NM |

These parameters also resulted in production of poor quality film.

EXAMPLE 9

| Film Blowing Zone | Die Zone | Work Zone | Feed Zone |
|---|---|---|---|
| 182 | 202 | 189 | 182 |

These parameters resulted in the production of poor quality film.

EXAMPLE 10

| Film Blowing Zone | Die Zone | Work Zone | Feed Zone |
|---|---|---|---|
| 192 | 197 | 181 | 176 |

These parameters also resulted in production of poor quality film.

EXAMPLE 11

| Film Blowing Zone | Die Zone | Work Zone | Feed Zone |
|---|---|---|---|
| 192 | 191 | 177 | 171 |

It was not possible to produce film at these temperatures.

EXAMPLE 12

| Film Blowing Zone | Die Zone | Work Zone | Feed Zone |
|---|---|---|---|
| 213 | 212 | 208 | 200 |

| | |
|---|---|
| Pressure | 45 bar (4500 kN/M$^2$) |
| Rpm | 301 |

Good quality film was produced.

EXAMPLE 13

| Film Blowing Zone | Die Zone | Work Zone | Feed Zone |
|---|---|---|---|
| 214 | 211 | 207 | 200 |

| | |
|---|---|
| Pressure | 40–45 bar (4000–4500 kN/M$^2$) |
| Torque | 8–8.5 NM |
| Feed | 0.35 |

EXAMPLE 14

| Film Blowing Zone | Die Zone | Work Zone | Feed Zone |
|---|---|---|---|
| 219 | 214 | 215 | 202 |

Good quality film was produced.

EXAMPLE 15

| Film Blowing Zone | Die Zone | Work Zone | Feed Zone |
|---|---|---|---|
| 222 | 218 | 216 | 203 |

Good quality film was produced.

EXAMPLE 16

| Film Blowing Zone | Die Zone | Work Zone | Feed Zone |
|---|---|---|---|
| 225 | 220 | 219 | 204 |

These parameters resulted in borderline quality.

EXAMPLE 17

| Film Blowing Zone | Die Zone | Work Zone | Feed Zone |
|---|---|---|---|
| 229 | 221 | 221 | 204 |

Poor quality film was produced.

EXAMPLE 18

| Film Blowing Zone | Die Zone | Work Zone | Feed Zone |
|---|---|---|---|
| 228 | 223 | 224 | 205 |

Poor quality film was produced.

EXAMPLE 19

| Film Blowing Zone | Die Zone | Work Zone | Feed Zone |
|---|---|---|---|
| 228 | 226 | 227 | 206 |

Poor quality film was produced.

EXAMPLE 20

| Film Blowing Zone | Die Zone | Work Zone | Feed Zone |
|---|---|---|---|
| 228 | 229 | 231 | 206 |

Poor quality film was produced.

EXAMPLE 21

| Film Blowing Zone | Die Zone | Work Zone | Feed Zone |
|---|---|---|---|
| 228 | 231 | 231 | 206 |

Poor quality film was produced.

EXAMPLE 22

| Film Blowing Zone | Die Zone | Work Zone | Feed Zone |
|---|---|---|---|
| 238 | 230 | 231 | 206 |

It was not possible to blow film from the material exiting the screw extruder at these temperatures.

EXAMPLE 23

| Film Blowing Zone | Die Zone | Work Zone | Feed Zone |
|---|---|---|---|
| 213 | 210 | 207 | 201 |

Good quality film was produced.

| | |
|---|---|
| Pressure | 35–40 bar (3500–4000 kN/M$^2$) |
| Torque | 7.6–8.0 NM |
| Rpm | 302 |

EXAMPLE 24

| Film Blowing Zone | Die Zone | Work Zone | Feed Zone |
|---|---|---|---|
| 212 | 211 | 208 | 201 |

Good quality film was produced.

EXAMPLE 25

| Film Blowing Zone | Die Zone | Work Zone | Feed Zone |
|---|---|---|---|
| 213 | 210 | 204 | 194 |

Good quality film was produced.

| | |
|---|---|
| Pressure | 40–45 bar (4000–4500 kN/M$^2$) |
| Torque | 7.7–8.2 NM |

EXAMPLE 26

| Film Blowing Zone | Die Zone | Work Zone | Feed Zone |
|---|---|---|---|
| 213 | 209 | 208 | 194 |

EXAMPLE 27

| Film Blowing Zone | Die Zone | Work Zone | Feed Zone |
|---|---|---|---|
| 210 | 208 | 202 | 194 |

EXAMPLE 28

| Film Blowing Zone | Die Zone | Work Zone | Feed Zone |
|---|---|---|---|
| 209 | 210 | 204 | 197 |

EXAMPLE 29

Ingredients 5 kg PVA
5% w/w stearamide (0.25 kg)
5% w/w glycerol (0.25 kg)
Temperatures

| Film Blowing Zone | Die Zone | Work Zone | Feed Zone |
|---|---|---|---|
| 211 | 211 | 207 | 202 |

The quality of the film produced was good

| Pressure | 35–40 bar (3500–4000 kN/M$^2$) |
|---|---|
| Torque | 7.9–8.2 NM |
| RPM | 303 |

EXAMPLE 30

Ingredients 5 kg PVA
4% w/w stearamide (0.20 kg)
5% w/w glycerol (0.25 kg)
Temperatues

| Film Blowing Zone | Die Zone | Work Zone | Feed Zone |
|---|---|---|---|
| 212 | 210 | 207 | 202 |

The quality was poor and the film produced was not commercial quality.

| Pressure | 45–50 bar (4500–5000 kN/M$^2$) |
|---|---|
| Torque | 8–8.3 NM |
| RPM | 301 |

EXAMPLE 31

Ingredients 5 kg PVA
3% w/w stearamide (0.15 kg)
5% w/w glycerol (0.25 kg)
Temperatures

| Film Blowing Zone | Die Zone | Work Zone | Feed Zone |
|---|---|---|---|
| 212 | 210 | 208 | 202 |

The film was poor quality.

| Pressure | 48–50 bar (4800–5000 kN/M$^2$) |
|---|---|
| Torque | 8.3–8.5 NM |
| RPM | 303 |

EXAMPLE 32

Ingredients 5 kg PVA
2% w/w stearamide (0.10 kg)
5% w/w glycerol (0.25 kg)
Temperatures

| Film Blowing Zone | Die Zone | Work Zone | Feed Zone |
|---|---|---|---|
| 212 | 212 | 209 | 202 |

The film produced was poor quality.

| Pressure | 58–60 bar (5800–6000 kN/M$^2$) |
|---|---|
| Torque | 9.1–9.4 NM |
| RPM | 303 |

EXAMPLE 33

Ingredients 5 kg PVA
1% w/w stearamide (0.05 kg)
5% w/w glycerol (0.25 kg)
Temperatures

| Film Blowing Zone | Die Zone | Work Zone | Feed Zone |
|---|---|---|---|
| 212 | 215 | 210 | 202 |

The quality produced was poor.

| Pressure | 60–64 bar (6000–6400 kN/M$^2$) |
| Torque | 9.7–10.4 NM |
| RPM | 303 |

EXAMPLE 34

Ingredients 5 kg PVA
7.5% w/w stearamide (0.375 kg)
Temperatures

| Film Blowing Zone | Die Zone | Work Zone | Feed Zone |
|---|---|---|---|
| 212 | 209 | 201 | 198 |

Very poor quality film produced.

| Pressure | 40 bar (4000 kN/M$^2$) |
| Torque | 7.1–7.4 NM |

EXAMPLE 35

Ingredients 5 kg PVA
5% w/w stearamide (0.25 kg)
4% w/w glycerol (0.20 kg)
Temperatures

| Film Blowing Zone | Die Zone | Work Zone | Feed Zone |
|---|---|---|---|
| 214 | 219 | 211 | 199 |

The quality of the film produced was good.

| Torque | 9.5–9.9 NM |

EXAMPLE 36

Ingredients 5 kg PVA
5% w/w stearamide (0.25 kg)
3% w/w glycerol (0.15 kg)
The quality of the film produced was poor.

EXAMPLE 37

Ingredients 5 kg PVA
5% w/w stearamide (0.25 kg)
2% w/w glycerol (0.10 kg)
Very poor quality film produced.

The following examples detail the compounding temperatures resulting from processing the material under various different conditions at the pre-mixing stages.

EXAMPLE 38

The PVA/stearamide and glycerol were heated to 140° C. in the forced action blender.

Temperatures at Compounding Stage

| Film Blowing Zone | Die Zone | Work Zone | Feed Zone |
|---|---|---|---|
| 214 | 212 | 210 | 197 |

The quality of the film produced was good.

| Pressure | 50–55 bar (5000–5500 kN/M$^2$) |
| Torque | 8.1–8.6 NM |

EXAMPLE 39

The mix was heated to 145° C. during the pre-mix stage.

Temperatures at Compounding Stage

| Film Blowing Zone | Die Zone | Work Zone | Feed Zone |
|---|---|---|---|
| 213 | 213 | 211 | 197 |

The quality was borderline acceptable.

| Pressure | 65 bar (6500 kN/M$^2$) |
| Torque | 6.6–6.9 NM |

EXAMPLE 40

The mix was heated to 150° C. during the pre-mix stage.

Temperatures at Compounding Stage

| Film Blowing Zone | Die Zone | Work Zone | Feed Zone |
|---|---|---|---|
| 215 | 214 | 211 | 197 |

The quality was borderline acceptable.

| Pressure | 65 bar (4000 kN/M$^2$) |
| Torque | 8.6–8.9 NM |

EXAMPLE 41

The mix was heated to 160° C. during the pre-mix stage.

Temperatures at Compounding Stage

| Film Blowing Zone | Die Zone | Work Zone | Feed Zone |
|---|---|---|---|
| 213 | 209 | 210 | 198 |

These parameters produced poor quality film.

| Pressure | 40 bar (4000 kN/M²) |
| --- | --- |
| Torque | 7.1–7.3 NM |

EXAMPLE 42

The mix was heated to 119° C. during the pre-mix stage.
Temperatures at Compounding Stage

| Film Blowing Zone | Die Zone | Work Zone | Feed Zone |
| --- | --- | --- | --- |
| 214 | 215 | 211 | 197 |

The quality of the film produced was good.

| Pressure | 70 bar (7000 kN/M²) |
| --- | --- |
| Torque | 9.0–9.4 NM |

EXAMPLE 43

The mix was heated to 117° C. during the pre-mix stage.
Temperatures at Compounding Stage

| Film Blowing Zone | Die Zone | Work Zone | Feed Zone |
| --- | --- | --- | --- |
| 216 | 215 | 211 | 197 |

The quality of the film produced was good.

| Pressure | 68–70 bar (6800–7000 kN/M²) |
| --- | --- |
| Torque | 8.7–9.0 NM |

EXAMPLE 44

The mix was heated to 113° C. during the pre-mix stage.
Temperatures at Compounding Stage

| Film Blowing Zone | Die Zone | Work Zone | Feed Zone |
| --- | --- | --- | --- |
| 213 | 215 | 211 | 196 |

The quality of the film produced was good.

| Pressure | 70–75 bar (7000–7500 kN/M²) |
| --- | --- |
| Torque | 9.2–9.6 NM |

EXAMPLE 45

The mix was heated to 106° C. during the pre-mix stage.
Temperatures at Compounding Stage

| Film Blowing Zone | Die Zone | Work Zone | Feed Zone |
| --- | --- | --- | --- |
| 214 | 217 | 212 | 196 |

The quality of the film produced was good.

| Pressure | 75–80 bar (7500–8000 kN/M²) |
| --- | --- |
| Torque | 9.6–10.0 NM |

EXAMPLE 46

The mix was heated to 100° C. during the pre-mix stage.
Temperatures at Compounding Stage

| Film Blowing Zone | Die Zone | Work Zone | Feed Zone |
| --- | --- | --- | --- |
| 213 | 213 | 209 | 195 |

The quality of the film produced was not commercial quality.

| Pressure | 70–80 bar (7000–8000 kN/M²) |
| --- | --- |
| Torque | 8.1–8.4 NM |

The improvements to biodegradable PVA plastics materials described herein can be summarised as follows:
1. The PVA an be readily formed and worked to produce a non-laminated layer of PVA as a film or a shaped article.
2. Any or each surface of the film or article may be treated to render it water resistant.
3. This PVA plastics product, when ruptured and/or immersed in water will dissolve completely and will biodegrade to completion over a period of about 28 days excluding the phenoxy resin waterproofing agent which does not biodegrade.
4. All the components used in the manufacture of the PVA are foodgrade additives.

It will of course be understood that the invention is not limited to the specific details described herein, which are given by way of example only, and that various modifications and alterations are possible within the scope of the appended claims.

I claim:

1. A method of manufacturing a biodegradable plastics material comprising the steps of mixing partially hydrolysed, water soluble polyvinyl alcohol (PVA) co-polymer feedstock with a stabiliser, adding a plasticiser to the mixture of stabiliser and PVA and mixing at a temperature in the range of 106 to 140° C., and compounding the resultant material at a temperature in the range of 195–225° C. to produce a useable, commercial product which can readily be worked by known processes and is suitable for the manufacture of water soluble and biodegradable articles, the stabiliser comprising stearamide or stearate used in an amount in the range of 4 to 6% weight/weight PVA.

2. The method according to claim 1, wherein the mixing of the PVA, stabiliser and plasticiser is carried out at a temperature in the range of 116 to 135° C.

3. The method according to claim 1, wherein the mixing of the PVA, stabiliser and plasticiser is carried out at a temperature in the range of 123 to 129° C.

4. The method according to claim 1, wherein the plasticiser comprises glycerol or glycerine solution or soya bean oil.

5. The method according to claim 1, wherein the plasticiser is included in an amount in the range of 3 to 15% weight/weight PVA.

6. The method according to claim 1, wherein the PVA, stabiliser and plasticiser are mixed in a forced action blender.

7. A method according to claim 1, including the step of pelletising the resultant product to produce a useable, commercial pellet.

8. The method according to claim 1, wherein the method further includes the step of processing the compounded product or pellet further by blow moulding, cast extrusion, injection moulding or any other suitable plastics processing procedure to produce an article.

9. The method according to claim 8, further comprising the step of applying a waterproofing agent to at least a portion of the surface of the article so that at least a portion thereof is rendered resistant to water to prevent premature dissolution of the article on contact with water.

10. The method according to claim 9, wherein the waterproofing agent is a phenoxy resin.

11. The method according to claim 1, wherein the PVA feedback comprises cold or hot soluble, partially hydrolysed PVA which is 70–85 wt % polyvinyl alcohol.

12. A biodegradable, plastics material produced by a method as claimed in claim 1.

13. An article produced by the method as claimed in claim 1, wherein the article is fully or substantially fully biodegradable.

14. An article produced by the method as claimed in claim 1, wherein the biodegrading of the article commences on contact of the article with water.

* * * * *